(12) United States Patent
Müller

(10) Patent No.: US 7,003,320 B2
(45) Date of Patent: Feb. 21, 2006

(54) METHOD FOR CONTROLLING A USER TERMINAL OF A COMMUNICATIONS NETWORK

(75) Inventor: Ulrich Müller, Ulm (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/473,327

(22) PCT Filed: Mar. 12, 2002

(86) PCT No.: PCT/IB02/00757

§ 371 (c)(1),
(2), (4) Date: Mar. 3, 2004

(87) PCT Pub. No.: WO02/080599

PCT Pub. Date: Oct. 10, 2002

(65) Prior Publication Data

US 2004/0152445 A1  Aug. 5, 2004

(30) Foreign Application Priority Data

Mar. 28, 2001 (EP) .................................. 01107901

(51) Int. Cl.
*H04B 1/38* (2006.01)
(52) U.S. Cl. ..................... 455/558; 455/410; 455/411; 455/418; 455/414.1; 235/382
(58) Field of Classification Search ............... 455/558, 455/414.1, 466, 410, 418; 235/382; 707/104.1
See application file for complete search history.

(56) References Cited

U.S. PATENT DOCUMENTS

| | | | |
|---|---|---|---|
| 5,103,079 A | * | 4/1992 | Barakai et al. ............. 235/380 |
| 5,148,474 A | * | 9/1992 | Haralambopoulos et al. .................... 379/114.25 |
| 5,353,328 A | * | 10/1994 | Jokimies ..................... 455/558 |
| 5,404,580 A | * | 4/1995 | Simpson et al. ............ 455/558 |
| 5,675,628 A | * | 10/1997 | Hokkanen ................... 455/433 |
| 5,687,216 A | * | 11/1997 | Svensson .................. 455/412.2 |
| 5,761,624 A | * | 6/1998 | Mooney et al. ............. 455/558 |
| 5,875,404 A | * | 2/1999 | Messiet ...................... 455/558 |
| 5,884,193 A | * | 3/1999 | Kaplan ....................... 455/565 |
| 5,887,253 A | * | 3/1999 | O'Neil et al. ............... 455/418 |

(Continued)

FOREIGN PATENT DOCUMENTS

WO  WO 99/18704  4/1999

*Primary Examiner*—William Trost
*Assistant Examiner*—Sharad Rampuria
(74) *Attorney, Agent, or Firm*—Alfred A. Fressola; Ware, Fressola, Van Der Sluys & Adolphson LLP

(57) ABSTRACT

The present invention relates to a method for controlling a user terminal of a communications network, the user terminal having a communications unit, a subscriber identification means including a restricted using mode list, each entry of which includes an identifier (AI) and/or ID-number of a communications link and/or a class of communications links which are allowed when a restricted using mode of the user terminal is enabled, and memory means for storing entries including identifiers and associated ID-numbers of communications links. The inventive method comprises: inputting a request for a communications link (S10) and building-up requested communications links (S50), if the restricted using mode is not enabled (S20); otherwise comparing the ID-number of the requested communications link with entries of the restricted using mode list (S40) and building-up the requested communications link (S50), if the ID-number matches an entry of the restricted using mode list; otherwise rejecting the request (S45).

3 Claims, 2 Drawing Sheets

U.S. PATENT DOCUMENTS

| | | | |
|---|---|---|---|
| 5,940,773 A * | 8/1999 | Barvesten | 455/558 |
| 6,011,976 A | 1/2000 | Michaels et al. | |
| 6,148,192 A * | 11/2000 | Ahvenainen | 455/410 |
| 6,169,897 B1 * | 1/2001 | Kariya | 455/456.3 |
| 6,178,336 B1 * | 1/2001 | Crozat | 455/558 |
| 6,263,214 B1 * | 7/2001 | Yazaki et al. | 455/558 |
| 6,311,055 B1 * | 10/2001 | Boltz | 455/414.1 |
| 6,321,079 B1 * | 11/2001 | Cooper | 455/411 |
| 6,427,073 B1 * | 7/2002 | Kortesalmi et al. | 455/414.1 |
| 6,463,300 B1 * | 10/2002 | Oshima | 455/558 |

* cited by examiner

METHOD FOR CONTROLLING A USER TERMINAL OF A COMMUNICATIONS NETWORK

CROSS REFERENCE TO RELATED APPLICATIONS

This application is for entry into the U.S. national phase under §371 for International Application No. PCT/IB02/00757 having an international filing date of Mar. 12, 2002, and from which priority is claimed under all applicable sections of Title 35 of the United States Code including, but not limited to, Sections 120, 363 and 365(c), and which in turn claims priority under 35 USC §119 to European Patent Application No. 01107901.9 filed on Mar. 28, 2001.

TECHNICAL FIELD

The present invention relates to a method for controlling a user terminal of a communications network.

BACKGROUND OF THE INVENTION

A user terminal, for example a mobile phone or a telematics unit, usually comprises a communications unit, a subscriber identification means and memory means for storing data of frequently used communications links. Usually such memory means are provided as a personal phone book or the like on a SIM-card used as subscriber identification means.

As well known in the art, a SIM-card is used to prevent unallowed use of a mobile phone or a telematics unit by an unauthorized person. Therefore, after switching on a mobile phone or a telematics unit the user is prompted to input the personal identification number (PIN) that should be known only to persons who are authorized to use the corresponding user terminal in a communications network, in particular in a radio communications network.

To allow a restricted use, in particular call restrictions for the user of the terminal, an elementary file can be stored in the subscriber identification means for generating a fixed dialling number phone book the entries of which include a name or an identifier and/or an ID-number of a communications link and/or a class of communications links which are allowed only when the restricted using mode of a user terminal is enabled. The ID-number can be either a usual dialling number or a supplementary service control string.

After switching on and inputting the personal identification number a user terminal that provides the feature of a restricted using mode can be used only in this restricted using mode unless a second personal identification number is entered. This second personal identification number should be known only to the owner of the terminal or the SIM-card used therein, but not to a user who is allowed to use this terminal only in the restricted using mode.

After inputting the second personal identification number the restricted using mode is disabled and the user terminal can be used for unrestricted calls. In addition, it is possible to edit the elementary file for fixed dialling numbers, i.e. to add new entries, to delete entries or to amend entries to determine the extent or restriction of the use of the specific user terminal.

In case the restricted using mode is enabled, a dialling number input either from a key pad of the user terminal or from a personal phone book for requesting a call, is compared with the ID-numbers contained in the elementary file for fixed dialling numbers so as to allow the requested call only if the number input matches an ID-number of an entry in the elementary file for fixed dialling numbers. In case the input dialling number does not match an ID-number the requested call is rejected.

If the vehicles of a fleet are provided with user terminals like mobile phones or telematics units, it is possible for the fleet management to restrict the use of the mobile phones or telematics units so that, for example, private calls of the drivers of the vehicles can be prevented.

However, in case the restricted using mode is enabled, it is no longer possible to use value-added services with this user terminal since the Id-numbers of the value-added services are not known to the subscribers but are downloaded via the communications network into a specific memory means, file or region so that it is possible for the service provider to change the ID-number stored in the user terminal each time the ID-number of the value-added service has been changed due to an update of the standard structure that is used by the value-added service.

It might be possible to copy the ID-number of a value-added service stored in a specific memory in the user terminal and to input this ID-number into the elementary file for fixed dialling numbers so that this value-added service can be used even if the restricted using mode is enabled. However, in the case where the ID-number of a specific value-added service has been changed, the new ID-number is downloaded into the subscriber's user terminal and stored in the specific memory. After such an update a request for a communications link to this value-added service will be rejected in the restricted using mode since the new number doesn't match any number of the fixed dialling numbers stored in the respective elementary file.

Another example illustrates this problem. If the vehicles of the fleet of a car rental company are provided with telematics units to enable emergency services, traffic information services, route guidance services and other traffic related services, it is not possible to enter this ID-numbers in the elementary file for fixed dialling number since the ID-numbers of the respective communications links are not known. Therefore, the telematics unit can be used either unrestricted or without the traffic related services. In particular, it is not possible to offer only some of the value-added services in accordance with the customers wishes.

SUMMARY OF THE INVENTION

Accordingly it is an object of the present invention to provide a method for controlling a user terminal in such a way that communications links for ID-number which cannot be entered into a restricted using mode list can be selectively allowed even if the restricted using mode of the user terminal is enabled.

This object is achieved by inputting a request for a communications link and building-up the requested communications link, if the restricted using mode is not enabled; otherwise comparing the ID-number (DN, SSCS) of the requested communications link with the entries of the restricted using mode list (EF-FDN); and building-up the requested communications link, if the ID-number (DN, SSCS) matches an entry of the restricted using mode list (EF-FDN), otherwise rejecting the request; characterized by comparing, in case an entry in the memory means (23) has been selected for requesting a communications link, the identifier (AI) of a selected entry with identifiers (A1) of the restricted using mode list (EF-FDN) and building-up the requested communications link, if the identifier (A1) matches an entry of the restricted using mode list (EF-FDN), otherwise continuing with comparing the ID-number of the requested communications link with the entries of the restricted using mode list (EF-FDN). Advantageous developments and refinements of the invention are described in the subclaims.

According to the present invention, after inputting a request for a communications link, it is first checked whether the ID-number of the requested communications link, i.e. the dialling number or a supplementary service control string is input via a user interface or from a memory like a specific memory for ID-numbers of value-added services or a personal telephone book. In case it is an ID-number, in particular a dialling number is input via the user interface, the dialling number is compared with that in the restricted using mode list as known in the prior art . However, if the dialling number is retrieved from a memory, a name or an identifier of the requested communications link that belongs to the request is compared with identifiers in the restricted using mode list and if the name of the requested communications link matches the name of an entry in the restricted using mode list, the request is allowed and the requested communications link will be built up without comparing the ID-number with that of the restricted using mode list. In case the name of the requested communications link does not match an entry of the restricted using mode list, the dialling number is checked in the usual way for allowing or rejecting the request.

Thus, it is possible to select one or more value-added services that can be used even if a restricted using mode of a user terminal is enabled by simply inserting the corresponding identifier into the restricted using mode list.

Referring back to the above example, according to the present invention it is possible for a car rental company to comply with the customer's wishes for a use of specific traffic related services. If a customer wishes to use not only an emergency service but also a traffic information service and a route guidance service, the identifiers or a name of the respective services are entered into the restricted using mode list on a subscriber identification means. Therefore the customer who inserts this subscriber identification means in the user terminal device can use this user terminal exactly to this extent he/she wishes. On the other hand, if the next customer wishes to use the emergency service only, the identifiers of the other services are deleted from the restrict using mode list and therefore, these services are disabled in case the restricted using mode is enabled.

To improve the reliability of restricting the use to an extent defined by the owner of the user terminal or the subscriber identification means, an advantageous refinement of the invention is characterized by checking, in case that an entry in the memory means has been selected for requesting a communications link, whether or not the corresponding communications link provides access to value added services; and, if so, comparing the identifier of a selected entry with the identifiers of the restricted using mode list; otherwise continuing with comparing the ID-number of the requested communications link with the entries of the restricted using mode list. If the entries for communications links which provides access to value added services are stored in a corresponding list or file in the memory means, checking whether a requested communications link provides access to value added services can be easily performed by checking whether or not a selected entry is stored in the list of entries for communications links which provides access to value added services.

BRIEF DESCRIPTION OF THE DRAWINGS

An exemplary embodiment of the present invention is described in detail below with reference to the accompanying drawings. In the drawings.

Identical parts and elements are consequently provided with the same reference symbols throughout the drawings.

DETAILED DESCRIPTION

Figure 1:
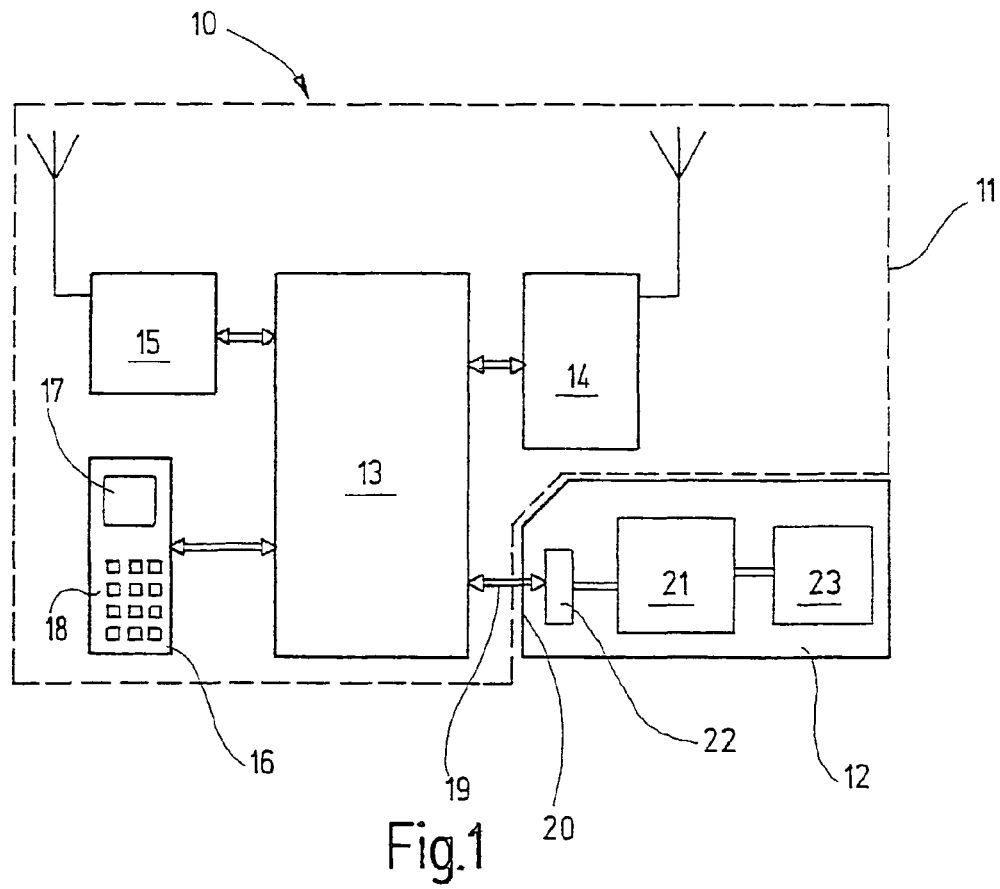
FIG. 1 shows a simplified schematic block diagram of a telematics unit serving as an example for a user terminal.

According to FIG. 1 a telematics unit 10 that is described as an example for a user terminal includes a mobile equipment 11 as a communications unit and a SIM-card 12 as a subscriber identification means.

The mobile equipment 11 comprises a central control unit 13 including processing means (not shown) and memory means (not shown) as necessary for communicating via a telecommunications network and for processing positioning information received from a positioning system and for dealing with data input by a user. The control unit 13 is connected with a transmitting/receiving module 14 for communicating via a telecommunications network, with a positioning module 15 for receiving positioning data and with a user interface 16. The user interface 16 comprises for example a display 17 for outputting data to a user and a key pad 18 for inputting data by a user. Instead of the display 17 and the key pad 18, other output and input means can be provided. In particular, it is also possible to provide a user interface 16 with audio output means like a loudspeaker and with voice input means in case that the control unit 13 supports voice control and audio or speech output.

Further, the control unit 13 is provided with connecting means 19 intended to cooperate with respective connecting means 20 of a SIM-card 12 for building up a connection between the control unit 13 and processing means 21 provided on the SIM-card 12. The processing means 21 of the SIM-card 12 is connected with the connecting means 20 via a respective interface 22. Further, memory means 23 is provided on the SIM-card 12 and is connected to the processing means 21. The memory means 23 is used for storing data necessary to identify the telematics unit 10 as a specific telematics unit used by an registered subscriber. In addition, it is used to store safety codes like first and second identification numbers, elementary files like a personal phone book, a restricted using mode list EF-FDN, and the like. In addition, alpha identifier, i.e. alpha numeric identifiers like names A1 and corresponding dialling numbers of several value-added services like emergency service, car tracking, breakdown service, traffic information service, route guidance service, sightseeing information service, position related event service, position related general information service and the like can be stored in specific files or portions in the memory means 23 on the SIM-card 12. In particular, all data necessary for individualization of a telematics unit 10 and for making the wanted services available should be stored in the memory means 23 on the SIM-card 12.

The identifiers A1 are stored in a service list 24 whereas the ID-numbers of the communications links CL for access to the services can be stored in separate file or list 25. In particular, it is possible to use only one identifier for a group of services using different communications links.

After inserting the SIM-card 12 into the device of the mobile equipment 11 so that the processing means 21 and the control unit 13 are interconnected, the complete telematics unit 10 is switched on. Thereafter, the user is first prompted to input the first personal identification number to identify him/herself as authorized user. Thereafter, the telematics unit is activated and can be operated in a restricted using mode that is automatically enabled after activating the telematics unit 10.

To disable the restricted using mode the user has to enter a second personal identification number to identify her/himself as being authorized to use the telematics unit in an unrestricted manner and to edit the restricted using mode list EF-FDN. Editing the restricted using mode list EF-FDN is possible within the telematics unit 10 but should be also possible outside the telematics unit 10 in a specific editing station (not shown). However, in both cases at least the second personal identification number has to be input to allow the user to edit the restricted using mode list EF-FDN.

Figure 3:
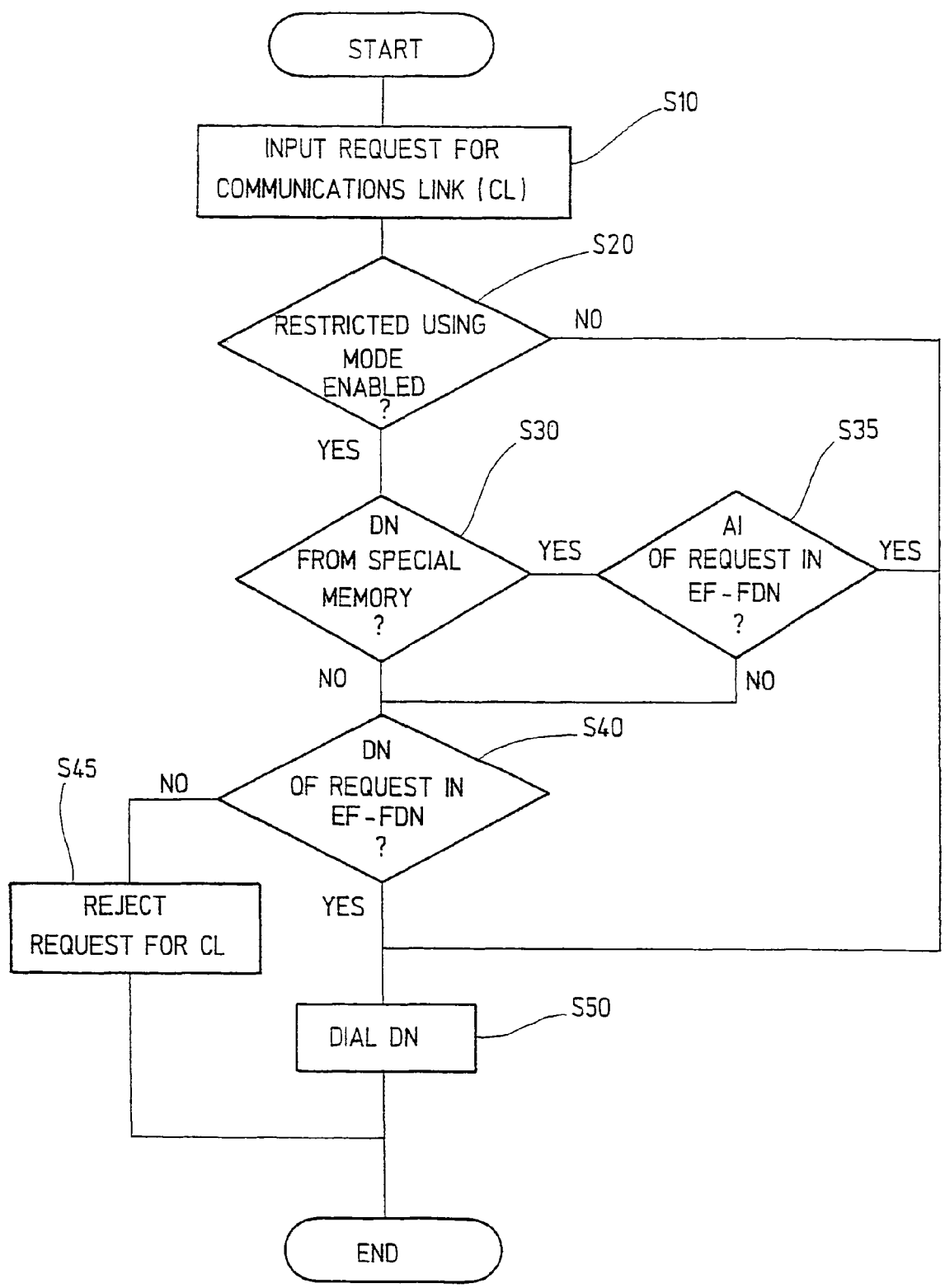
FIG. 3 shows a simplified schematic flow chart for the inventive method.

When a user intends to call someone else, he/she has to input a request for a communications link as shown as step S10 in FIG. 3. Inputting such a request can be performed either by inputting a dialling number DN via the user interface 16 or by selecting an entry of a personal phone book or by selecting a specific service from a service list 24 generally available with this specific telematics unit 10. If the request is input by means of the personal phone book or the service list 24, the name or identifier A1 of the person or service to be called is input together with the respective dialling number. Thereafter, it is checked in step S20 whether or not the restricted using mode is enabled. If the answer is yes it is checked in step S30 whether or not the dialling number is input from a special memory, i.e. from the service list that is for download use only. If the answer is no, e. g. if the dialling number is input via the user interface 16, the dialling number as input is compared in step S40 with the dialling number entries of the restricted using mode list EF-FDN. If the answer is yes, i.e. if the dialling number as input matches one of the dialling number entries in the restricted using mode list EF-FDN, the dialling number DN will be dialed in step S50.

If the restricted using mode is disabled, i.e. the answer in step S20 is no, the method branches directly to step S50 so that any dialling number input from anywhere will be dialed in step S50.

However, if the restricted using mode is enabled, so that it is checked in step S30 which source is used for inputting the dialling number DN, and if it is determined that the dialling number is input from the special memory, the method branches to step S35 to check whether or not the identifier A1 of the request matches an entry of the restricted using mode list EF-FDN. In case the identifier AI or a name of the request is not found in the restricted using mode list, the method continuous to check whether or not a communications link CL according to the dialling number DN as input is allowed as it is done for a dialling number input via the user interface 16.

However, if the identifier A1 or a name is found in the restricted using mode list the method goes to step S50 for dialing the corresponding dialling number DN without checking the dialling number itself.

In the latter case it is presumed that the dialling number DN is associated with the name or identifier A1 of a service in such a way that it cannot be manipulated by a user.

Therefore, it is possible that the dialling number DN for connecting the respective service provider can be changed by downloading from the service provider without causing problems when requesting a communications link to the service or service provider, since the dialing number itself is not checked but only the associated identifier of the requested service.

In case there is no service entry in the restricted using mode list EF-FDN and if there is no dialling number DN entry, either, the method goes from step 40 to step 45 and rejects the request for the communications link CL. When rejecting a request the user is preferably informed that the request as input is not allowed or not possible in the actual using mode of the telematics unit 10.

Figures 2A, 2B:
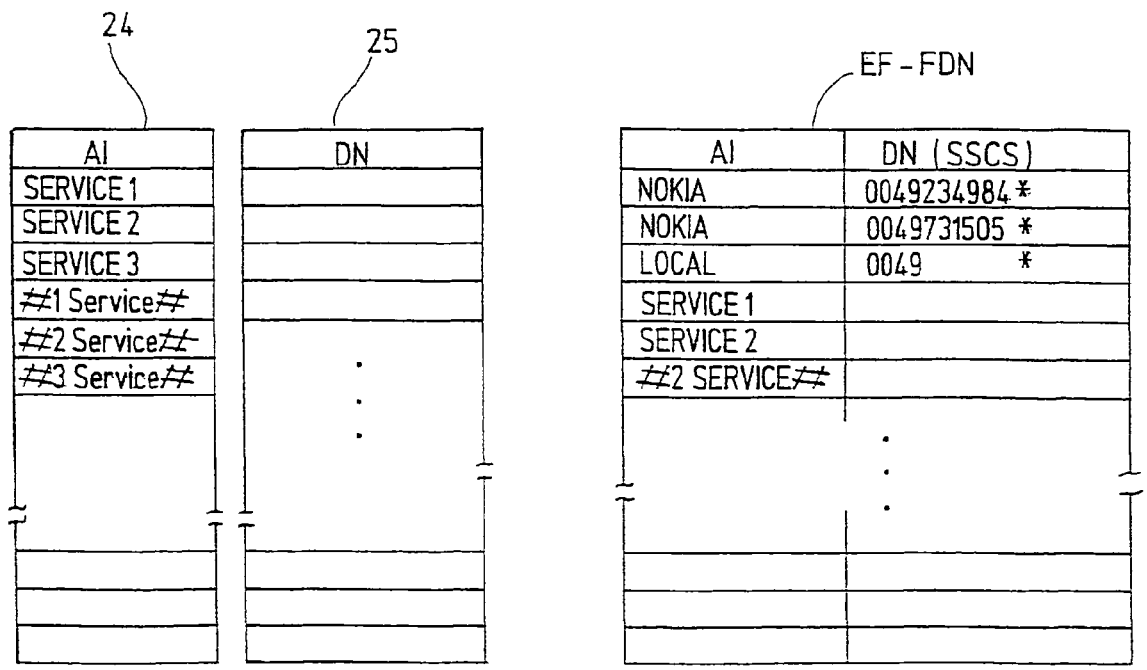
FIG. 2a shows a simplified schematic memory structure used for storing the identifier and the ID-numbers or dialling numbers of specific value-added services.
FIG. 2b shows a simplified schematic structure of an elementary file for fixed dialling numbers stored in a memory of a subscriber identification module.

In case the service provider offers traffic related services as groups or packages of different categories, for example if the provider offers a first category package of services including emergency services, remote and car tracking services, a second category package of services including the services of that of the first category and in addition a breakdown service, and a third category service package that allows access to all of the former services and to any other offered comfort services like traffic information and route guidance services, it is possible to provide access to these services stepwise by specific identifier like #1service#, #2service# and #3service#. In this case, only one of the identifiers of the different packages of services has to be entered into the restricted using mode list EF-FDN to allow access to all services of the respective package. In this case the entry of one of the service packages allows access to all dialling numbers DN associated with the respective identifier A1. For example, as shown in FIG. 2b, the identifier AI of the second category package of services is registered in the restricted using mode list EF-FDN so that all dialling numbers DN associated with this identifier A1 are allowed for service access.

If the telematics unit is provided with a backup subscriber identification module that includes a restricted using mode list EF-FDN and if a SIM-card 12 is inserted in the mobile equipment 11 of the telematics unit 10, but without an entry of any service, and this SIM-card is already known in the telematics unit internal SIM table as a SIM-card that usually allows access to value-added services, it is possible to prompt the user for the second personal identification number and the desired services, i.e. the desired package of services that shall be allowed. If the second personal identification number is successfully entered, the respective entry within the restricted using mode list of the SIM-card will be entered into the restricted using mode list EF-FDN in the memory 23 of the SIM-card 12.

The backup subscriber identification module of the telematics unit and the SIM-card of the user are handled similarly. If the backup subscriber identification module has no applicable entry in a respective restricted using mode list EF-FDN, it can be provided that only the basic level package of services, i.e. emergencies services, remote and car tracking services are allowed to improve the safety of the passengers of the respective vehicle in case of emergency. In particular, this means emergency calls and short message service will be allowed assuming that the owner of the backup subscriber identification module agrees, when this module is built into the telematics unit and a registration for the first level package of services is done with it and has been confirmed by the user before.

According to another embodiment of the present invention, it is checked from which kind of memory the dialling number DN has been retrieved when it has been verified in step S30 that the dialling number DN is received from a memory. In this case, the method goes immediately to step S40 if the dialling number DN has not been received from the special memory that is for download use only, i.e. if the dialling number DN is received from a personal phone book that can be edited by any authorized user without inputting the second personal identification number. In this case only, if the dialling number is retrieved from a memory containing dialling numbers for communications links to specific services which are associated with service identifier inserted in a service list, the associated identifier of a service or a package of services is compared with the entries in the restricted using mode list.

Thus it is checked whether the request as input is for a communications link to a service or service provider, so as to prevent a user who tries to dial an unallowed dialling number by inputting the desired dialling number together with the name of a service as entered in the restricted using mode list. Thus, for example both, a backup subscriber identification module or a user subscriber identification module can be configured to allow only selected value-added services and to set up calls to a lot of defined phone numbers, for example to phone numbers of the company of the car holders or the fleet management.

The invention claimed is:

1. A method for controlling a user terminal (10) of a communications network, said user terminal (10) having a communications unit (11), a subscriber identification means (12) including a restricted using mode list (EF-FDN) each entry of which includes an identifier (AI) and/or an ID-number (DN, SSCS) of a communications link and/or a class of communications links which are allowed when a restricted using mode of said user terminal (10) is enabled, and memory means (23) for storing entries including identifiers (AI) and associated ID-numbers (DN, SSCS) of communications links;

said method comprising the steps of:
 inputting a request for a communications link; and
 building-up said requested communications link, if said restricted using mode is not enabled; otherwise
 comparing said ID-number (DN, SSCS) of said requested communications link with said entries of said restricted using mode list (EF-FDN); and
 building-up said requested communications link, if said ID-number (DN, SSCS) matches an entry of said restricted using mode list (EF-FDN); otherwise
 rejecting said request;

characterized by
 comparing said identifier (AI) of a selected entry with said identifiers (A1) of said restricted using mode list (EF-FDN), if an entry in said memory means (23) has been selected for requesting a communications link; and
 building-up said requested communications link, if said identifier (A1) matches an entry of said restricted using mode list (EF-FDN); otherwise
 continuing with comparing said ID-number of said requested communications link with said entries of said restricted using mode list (EF-FDN).

2. A method according to claim 1, characterized by
 checking, in case that an entry in said memory means (23) has been selected for requesting a communications link, whether or not the corresponding communications link provides access to value added services; and
 if so, comparing said identifier (AI) of said selected entry with said identifiers (A1) of said restricted using mode list (EF-FDN); otherwise
 continuing with comparing said ID-number of said requested communications link with said entries of said restricted using mode list (EF-FDN).

3. A method according to claim 2, characterized in that
 said entries for communications links which provide access to value added services are stored in a corresponding list (24) in said memory means (23); and
 it is checked whether or not a selected entry is stored in said list (24) of entries for communications links which provides access to value added services for checking whether or not the corresponding communications link provides access to value added services.

* * * * *